May 22, 1923.  1,455,786
S. D. HARTOG
SHEET METAL PISTON
Filed Nov. 19, 1919
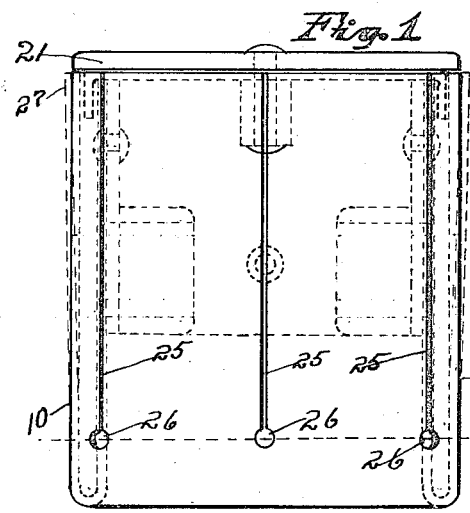
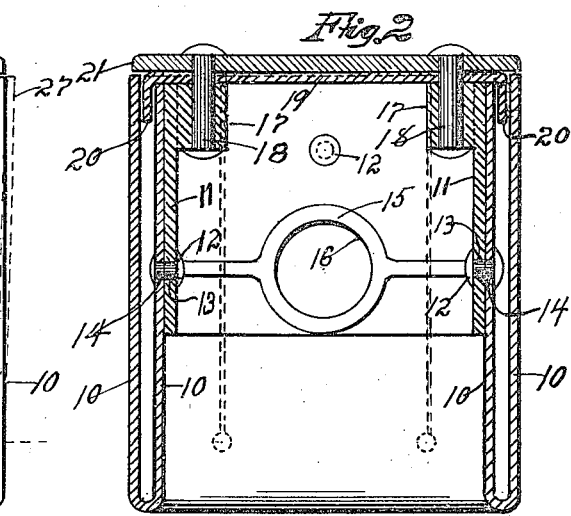
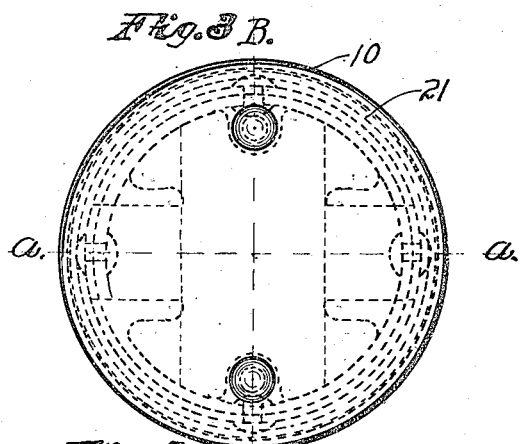
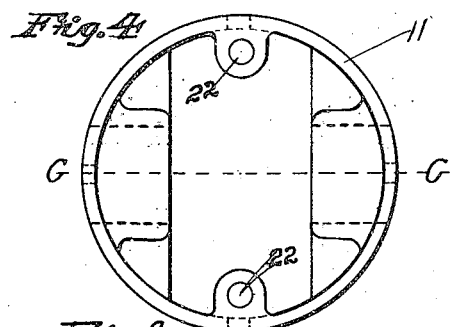
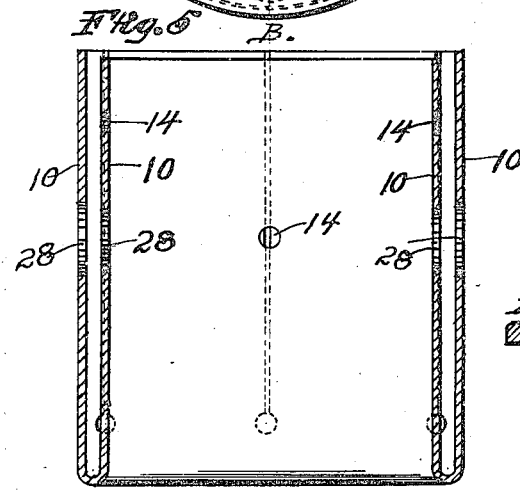
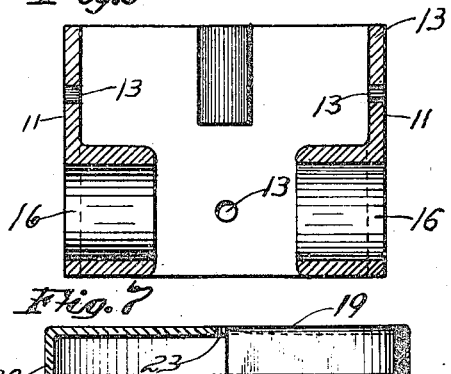
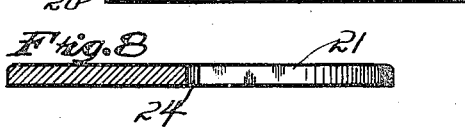
Inventor
Stephen D. Hartog Patented May 22, 1923.

1,455,786

UNITED STATES PATENT OFFICE.

STEPHEN D. HARTOG, OF ST. LOUIS, MISSOURI.

SHEET-METAL PISTON.

Application filed November 19, 1919. Serial No. 339,047.

*To all whom it may concern:*

Be it known that I, STEPHEN D. HARTOG, a citizen of the United States, and a resident of the city of St. Louis, and State of Missouri, have invented new and useful Improvements in Sheet-Metal Pistons, of which the following is a specification.

This invention relates to pistons.

A piston, more particularly, for use in hydrocarbon engines characterized by the features of construction in which provision is made for a tensionally resilient cylinder fitting body portion, a piston having member parts arranged within its structure made of a different metallic composition than that of the metal from which the body of the piston is made and therefore having a ratio of expansion when heated proportionately less than that of the material from which the body of the piston is made, a piston constructed with a member part adapted to prevent the cylinder fitting body portion of the piston from being reduced in its size other than its natural wear so as to enable the cylinder fitting body of the piston to have at all times a snug slidable fit within the cylinder, a piston provided with a piston pin support free from and independent of the cylinder fitting body of the piston, a piston having a tapering cylinder fitting body, are among the several objects of the present invention.

Further and other objects will appear as in the detailed description given and which also will serve to enable others to clearly understand, make and use the invention as set forth in the following specification, supplemented by the accompanying drawing in which:

Fig. 1, is a side elevation.

Fig. 2, is a section in elevation through line *a—a* Fig. 3.

Fig. 3, is a plan view of Fig. 1.

Fig. 4, is a plan view of Fig. 6, a member part of this invention.

Fig. 5, is a section in elevation of the body portion of this invention.

Fig. 6, is a section in elevation of Fig. 4, through line *c—c*.

Fig. 7, is a side view in elevation partly in section of a member part of this construction.

Fig. 8, is a side view in elevation partly in section of the head member of this construction.

In the drawing like numerals indicate like parts throughout the several views of the drawings.

The body of the present construction of piston is composed of two parts integrally connected and forming outer and inner cylindrical portions 10, a connecting rod wrist pin supporting sleeve 11, having piston pin receiving bosses 15 properly machined to size at 16, rivet receiving holes 13 and 22, and bosses 17. The head member 21 of the piston is supported upon a sheet metal member 19 seated upon the upper end of the innner cylindrical portion and upon the upper end of the sleeve 11.

The body 10, comprising the outer and inner cylindrical portions is U-shape in cross-section. The material out of which the body 10 is made is thin light sheet metal, preferably aluminum. The outer cylindrical portion of the body of the piston 10 has a series of lengthwise extending slits 25 cut through its outer wall beginning at the upper free end of the body and extending axially downward and terminating in apertures 26 positioned approximately near the lower end of the outer portion of the body 10, and located circumferentially in spaced relation around the body of the piston.

In the drawing Figs. 4 and 6 illustrate in plan and section of the sleeve or bushing member 11; intended to be placed within the inner portion of the body 10 and securely held therein by rivets 12, which enter into or pass through holes formed in the sleeve 11 at 13, registering with holes in the inner portion of the body 10 at 14. The sleeve member 11 is provided with bosses 15 which are machined to size at 16 adapted to receive a well fitted pin, commonly called a piston pin but not here shown.

At a suitable position within the sleeve 11 are formed oppositely disposed bosses 17, having rivet receiving holes 22. The head portion of the piston comprises a disc member 19 interposed between head plate 21 and the upper end of the body 10, the head plate 21 and member 19 being mounted at the top of the piston and supported by the inner portion of the body 10 and the upper end of the sleeve 11. The disc 19 has a flange 20 located between the inner and outer portions of the body 10. The disc 19 and the head plate 21 are held securely in position by rivets 18, which pass through co-mating holes 23 in the disc 19 and holes 24 in the head plate 21 and engage in the holes 22 in the bosses 17.

The piston as is well known is subjected to a high degree of heat in consequence of which the metal comprising the entire piston is caused to expand. The expansion is not uniform being greater at the head portion of the piston, due to its direct contact with the explosive gases within the combustion chamber and of less proportion at the lower end, owing to the cooling effect of the lubricating oil and also the water cooled surrounding cylinder wall.

While the present invention is constructed in such a way as will enable it to operate although the heat temperature may be quite excessive and the piston body be thereby greatly expanded, no impediment to its successful performance is thereby encountered, owing to the fact that the cylinder fitting body portion of the piston is possessed of an inherent spring tensional resiliency due to the way in which it is formed and the further fact that the cylinder fitting body portion is in no way subject to the direct transmission of the high heat temperature to which the head portion of the piston is subjected.

While this invention comprises a construction operably efficient when the engine is cold or during its initial starting period it is proper to say that as the engine continues to operate and a rise in temperature is thereby generated sufficiently high in intensity to effect the cylinder fitting body portion 10, the piston would quite naturally lose its spring tensional resiliency, becoming smaller in diameter as a result of the closing of the slits 25, thereby reducing the size and fit of the body 10 within the cylinder.

To overcome this defect or incapacity the member 19 is made and placed in the described relationship with the body 10 for the special purpose of maintaining the size, form and fit of the piston body 10 within the cylinder, preventing any appreciable reduction in the size of the outer body 10, irrespective of the material composition from which the body 10 is made or the heat temperature to which it may be subjected, owing to the fact that the member 19 is made of metal especially applicable for this purpose being possessed of a metallic composition least effected by heat and exhibiting no appreciable expansion although subjected to a heat temperature of 1400 degrees Fahrenheit.

The member 19, illustrated partly in section at Fig. 7 in the drawing is made of material having a very small ratio of expansion when heated and constructed with a rim flanged edge 20, the outer diameter of which is less than the inner diameter of the outer portion of the body 10, by twice the thickness of the metal of the body at the position occupied by the rim 20, less also the amount to which it may expend at maximum heat temperature.

The body 10 may be pressed into form by die forming or casted so that a U shape form is presented, when viewed in cross-section, the purpose of which is to form an outer cylinder fitting body portion which when cut as illustrated and expanded as at 27 provides a series of sectors each of which has a spring tensional resiliency so that it will fit the cylinder and yield tensionally with such pressure as to overcome any looseness or slapping effect more particularly at the initial starting of the engine when in its cold state.

The member 19, positioned in assembly as illustrated in the sectional elevation Fig. 2, will effectively prevent the outer portion of the body 10 from any material reduction in size, though if the body be expanded by heat it will tensionally yield at all times to the size of the cylinder and supportedly held to size by the rim formed portion 20 of the member 19.

The sleeve or bushing member 11 may also be made of metal differing from that of the body 10, to the inner portion of which it is secured by riveting; the inner portion of the body 10, carrying the sleeve 11, member 19, and the head plate 21, being secured together. The body 10 is also provided with openings 28, which align in assembly with holes 16 in the bosses 15 of the sleeve 11 for the purpose of supporting a wrist pin.

From the foregoing description it is clear that this construction of an engine piston fulfills the purpose for which it is intended and it is therefore conceded that changes may be made in its size form and shape without departing from the spirit of the invention as set forth in the appended claims.

I claim as my invention and desire to secure by Letters Patent:

1. A piston, comprising an expansible body, and a member in connection with said body having a coefficient of expansion less than that of the body when heated, said member being located within said body and limiting the contraction of the body, and leaving the body free to expand independently of any pressure by said member.

2. A piston, comprising a resilient cylinder-fitting body, a member supported within the piston body and having a coefficient of expansion when heated less than the coefficient of expansion of the body, and means in connection with said member for limiting the contraction of the body and leaving the body free to expand independently of any pressure by said member.

3. A piston, comprising a tapering expansible cylinder body adapted to fit yieldingly within the cylinder for which it is intended, and a member in connection with the body leaving the body free to expand independently of and free from pressure by said member, said member having a coefficient of expansion when heated less than the coefficient of expansion of the body.

4. A piston, comprising a tapering expansible cylinder body adapted to fit yielding within the cylinder for which it is intended, a member in connection with the body leaving the body free to expand independently of and free from pressure by said member said member having a coefficient of expansion when heated less than the coefficient of expansion of the body, and means whereby said member will limit contraction of said body thereby preventing the body from reducing in size beyond that to which it is subjected by natural wear.

5. A piston comprising a body having external and internal portions integrally connected, said external portion having slits adapted to provide a yielding capacity for said external portion, a member positioned within said external portion having a ratio of expansion less in proportion when heated than that of the external portion of said body, said member adapted to maintain the size of said external portion of said body below which it cannot be reduced in its size, excepting that of its natural wear, and means provided on said internal portion of said body adapted to support connecting means for said piston independent of the external portion of said body.

6. A piston, comprising a split resilient body, a member located within the body having a coefficient of expansion less than the coefficient of expansion of the body when both are heated, and means whereby said member will limit contraction of the body and leave the body free to expand independently of and free from pressure thereby.

7. A piston, comprising a split resilient body, a member located within the body having a coefficient of expansion less than the coefficient of expansion of the body when both are heated, means whereby said member will limit contraction of the body and leave the body free to expand independently of and free from pressure thereby, a head plate for the piston, and means for securing the head plate in connection with the piston.

8. A piston, comprising a split resilient body, a member located within the body having a coefficient of expansion less than the coefficient of expansion of the body when both are heated, means whereby said member will limit contraction of the body and leave the body free to expand independently of and free from pressure thereby, a head plate for the piston, and means for securing the head plate in connection with the piston, in a relationship to leave the piston body free to expand independently of the head plate.

9. A piston, comprising a split resilient body, a member located within the body having a coefficient of expansion less than the coefficient of expansion of the body when both are heated, means whereby said member will limit contraction of the body and leave the body free to expand independently of and free from pressure thereby and means for supporting a wrist pin in connection with the piston body.

10. A piston, comprising a body composed of an outer cylindrical portion arranged to fit within a cylinder body and provided with slits extending downwardly from its upper end, and an inner cylindrical portion united with the outer cylindrical portion at their lower ends, and disconnected from the outer portion at their upper ends; and a head plate supported by said body.

11. A piston, comprising a body composed of an outer cylindrical portion arranged to fit within a cylinder body and provided with slits extending downwardly from its upper end, and an inner cylindrical portion united with the outer cylindrical portion at their lower ends, and disconnected from the outer portion at their upper ends; and a member, supported by the inner cylindrical portion having a coefficient of expansion less than the coefficient of expansion of the outer cylindrical portion, arranged to limit compression of the outer cylindrical portion.

12. A piston, comprising a body composed of an outer cylindrical portion arranged to fit within a cylinder body and provided with slits extending downwardly from its upper end, and an inner cylindrical portion united with the outer cylindrical portion at their lower ends, and disconnected from the outer portion at their upper ends; and a member, supported by the inner cylindrical portion having a coefficient of expansion less than the coefficient of expansion of the outer cylindrical portion, arranged to limit compression of the outer cylindrical portion and to leave the outer cylindrical portion free to expand independently of and free from pressure thereby.

13. A piston, comprising a body composed of an outer cylindrical portion arranged to fit within a cylinder body and provided with slits extending downwardly from its upper end, and an inner cylindrical portion united with the outer cylindrical portion at their lower ends, and disconnected from the outer portion at their upper ends; a member, supported by the inner cylindrical portion having a coefficient of expansion less than the coefficient of expansion of the outer cylindrical portion, arranged to limit compression of the outer cylindrical portion; and a head plate in connection with the piston body.

14. A piston, comprising a body composed of an outer cylindrical portion arranged to fit within a cylinder body and provided with slits extending downwardly from its upper end, and an inner cylindrical portion united with the outer cylindrical portion at their lower ends, and disconnected from the outer portion at their upper ends; a member, supported by the inner cylindrical portion having a coefficient of expansion less than the coefficient of expansion of the outer cylindrical portion, arranged to limit compression of the outer cylindrical portion; a head plate in connection with the piston body; and means supported by the inner cylindrical portion for supporting a wrist pin.

15. A piston, comprising an expansible body characterized by a tendency to expand and press against the wall of the cylinder for which it is intended and provided with slits extending from one end, and a member in connection with said body having a coefficient of expansion less than that of the body when heated, said member being located within said body and limiting the contraction of the body and leaving the body free to expand independently of any pressure by said member.

16. A piston, comprising an expansible body characterized by a tendency to expand and press against the wall of the cylinder for which it is intended and provided with slits extending from one end, and a non-contractible member in connection with said body having a coefficient of expansion less than that of the body when heated, said member being located within said body and limiting the contraction of the body and leaving the body free to expand independently of any pressure by said member.

17. A piston, comprising an expansible body characterized by a tendency to expand and press against the wall of the cylinder for which it is intended and provided with slits extending from one end, a member in connection with said body having a coefficient of expansion less than that of the body when heated, said member being located within said body and limiting the contraction of the body and leaving the body free to expand independently of any pressure by said member, a head plate for the piston, and means for holding said head plate in connection with the piston.

18. A piston, comprising an expansible body characterized by a tendency to expand and press against the wall of the cylinder for which it is intended and provided with slits extending from one end, a non-contractible member in connection with said body having a coefficient of expansion less than that of the body when heated, said member being located within said body and limiting the contraction of the body and leaving the body free to expand independently of any pressure by said member, and means for supporting a wrist pin in connection with said body leaving the body free to expand independently of any restraint by the wrist pin.

19. A piston, comprising an expansible body characterized by a tendency to expand and press against the wall of the cylinder for which it is intended and provided with slits extending from one end, a member in connection with said body having a coefficient of expansion less than that of the body when heated, said member being located within said body and limiting the contraction of the body and leaving the body free to expand independently of any pressure by said member, and means for supporting a wrist pin in connection with said body leaving the body free to expand independently of any restraint by the wrist pin.

In confirmation hereof I hereto attach my signature.

STEPHEN D. HARTOG.